United States Patent
Barber et al.

(10) Patent No.: US 8,678,323 B2
(45) Date of Patent: Mar. 25, 2014

(54) LAUNCH LOCK ASSEMBLIES INCLUDING AXIAL GAP AMPLIFICATION DEVICES AND SPACECRAFT ISOLATION SYSTEMS INCLUDING THE SAME

(75) Inventors: Tim Daniel Barber, Litchfield Park, AZ (US); Timothy Hindle, Peoria, AZ (US); Ken Young, Peoria, AZ (US); Torey Davis, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 109 days.

(21) Appl. No.: 13/406,647

(22) Filed: Feb. 28, 2012

(65) Prior Publication Data

US 2013/0221163 A1    Aug. 29, 2013

(51) Int. Cl.
*B64G 1/00*    (2006.01)
(52) U.S. Cl.
USPC ........................................ 244/173.1; 411/909
(58) Field of Classification Search
USPC .......... 244/173.1, 172.9, 173.2, 173.3, 172.6, 244/172.4
See application file for complete search history.

(56) References Cited

U.S. PATENT DOCUMENTS

| | | | | |
|---|---|---|---|---|
| 3,085,773 A | * | 4/1963 | Covey et al. | 248/555 |
| 3,334,563 A | * | 8/1967 | Kiper et al. | 396/462 |
| 3,405,593 A | * | 10/1968 | Marshall | 411/20 |
| 3,525,448 A | * | 8/1970 | Bauer | 414/715 |
| 3,983,965 A | * | 10/1976 | Wright, Jr. | 188/380 |
| 4,054,186 A | * | 10/1977 | Banks et al. | 188/378 |
| 4,185,720 A | * | 1/1980 | Wright et al. | 188/134 |
| 4,243,192 A | * | 1/1981 | Johnson | 244/215 |
| 4,429,862 A | * | 2/1984 | Niedecker | 269/47 |
| 5,040,748 A | * | 8/1991 | Torre et al. | 244/173.3 |
| 5,060,888 A | * | 10/1991 | Vezain et al. | 244/173.3 |
| 5,160,233 A | * | 11/1992 | McKinnis | 411/433 |
| 5,190,423 A | | 3/1993 | Ewing | |
| 5,209,596 A | | 5/1993 | Matczak et al. | |
| 5,620,154 A | | 4/1997 | Hey | |
| 5,722,709 A | | 3/1998 | Lortz et al. | |
| 6,126,115 A | | 10/2000 | Carrier et al. | |
| 6,330,995 B1 | | 12/2001 | Mangeiga et al. | |
| 6,350,074 B1 | | 2/2002 | Borges et al. | |
| 6,352,397 B1 | | 3/2002 | O'Quinn et al. | |

(Continued)

OTHER PUBLICATIONS

USPTO Office Action for U.S. Appl. No. 13/289,815 dated May 21, 2013.

(Continued)

*Primary Examiner* — Christopher P Ellis
*Assistant Examiner* — Medhat Badawi
(74) *Attorney, Agent, or Firm* — Ingrassia Fisher & Lorenz, P.C.

(57) ABSTRACT

Embodiments of a launch lock assembly are provided, as are embodiments of a spacecraft isolation system including one or more launch lock assemblies. In one embodiment, the launch lock assembly includes first and second mount pieces, a releasable clamp device, and an axial gap amplification device. The releasable clamp device normally maintains the first and second mount pieces in clamped engagement; and, when actuated, releases the first and second mount pieces from clamped engagement to allow relative axial motion therebetween. The axial gap amplification device normally residing in a blocking position wherein the gap amplification device obstructs relative axial motion between the first and second mount pieces. The axial gap amplification device moves into a non-blocking position when the first and second mount pieces are released from clamped engagement to increase the range of axial motion between the first and second mount pieces.

17 Claims, 8 Drawing Sheets

(56) References Cited

U.S. PATENT DOCUMENTS

| | | |
|---|---|---|
| 6,467,987 B1 | 10/2002 | Larsen et al. |
| 6,508,437 B1 | 1/2003 | Davis et al. |
| 6,661,331 B2 | 12/2003 | Valembois et al. |
| 6,669,393 B2 | 12/2003 | Schilling |
| 6,760,211 B2 | 7/2004 | Bueno Ruiz et al. |
| 6,769,830 B1 | 8/2004 | Nygren |
| 6,843,449 B1 | 1/2005 | Manteiga et al. |
| 7,001,127 B2 | 2/2006 | Tuszynski |
| 7,614,582 B2 | 11/2009 | Hafner |
| 7,674,063 B2 | 3/2010 | Jan et al. |
| 7,677,522 B2 | 3/2010 | Bakos |
| 7,753,612 B2 | 7/2010 | Bouru et al. |
| 7,878,448 B2 | 2/2011 | Olsen et al. |
| 8,371,534 B1 * | 2/2013 | Goodzeit et al. ............ 244/173.2 |
| 2005/0269445 A1 | 12/2005 | Chevalier et al. |
| 2008/0228332 A1 * | 9/2008 | Hindle et al. .................... 701/13 |
| 2009/0020381 A1 * | 1/2009 | Hindle et al. .................. 188/267 |
| 2009/0121399 A1 * | 5/2009 | Hindle et al. ............ 267/140.15 |
| 2009/0243169 A1 | 10/2009 | Hadden et al. |
| 2010/0101903 A1 * | 4/2010 | Boyd et al. .................... 188/268 |
| 2010/0320358 A1 * | 12/2010 | Boyd et al. .................... 248/636 |
| 2012/0012711 A1 * | 1/2012 | Ross et al. ................. 244/158.2 |
| 2012/0104177 A1 | 5/2012 | Choi et al. |
| 2012/0112010 A1 * | 5/2012 | Young et al. ................ 244/173.1 |
| 2013/0221163 A1 * | 8/2013 | Barber et al. ............... 244/173.1 |

OTHER PUBLICATIONS

USPTO Office Action; U.S. Appl. No. 13/289,815, notification date Dec. 21, 2012.

Young, K. et al.: "Mounting Systems for Structural Members, Fastening Assemblies Thereof, and Vibration Isolation Systems Including the Same" filed with the USPTO on Nov. 4, 2011 and assigned U.S. Appl. No. 13/289,815.

Barber, T. D., et al.: "Launch Lock Assemblies with Reduced Preload and Spacecraft Isolation Systems Including the Same" filed with the USPTO on Sep. 25, 2012 and assigned U.S. Appl. No. 13/626,843.

USPTO Office Action for U.S. Appl. No. 13/289,815 dated Sep. 18, 2013.

\* cited by examiner

LAUNCH LOCK ASSEMBLIES INCLUDING AXIAL GAP AMPLIFICATION DEVICES AND SPACECRAFT ISOLATION SYSTEMS INCLUDING THE SAME

STATEMENT REGARDING FEDERALLY SPONSORED RESEARCH OR DEVELOPMENT

This invention was made with Government support under NNG09HR00C awarded by NASA. The Government has certain rights in this invention.

TECHNICAL FIELD

The present invention relates generally to vibration isolation systems and, more particularly, to launch lock assemblies including axial gap amplification devices, as well as to spacecraft isolation systems including one or more launch lock assemblies.

BACKGROUND

Control moment gyroscope arrays, reaction wheel arrays, and other such devices deployed onboard spacecraft for attitude adjustment purposes generate vibratory forces during operation. Vibration isolation systems are commonly employed to minimize the transmission of vibratory forces emitted from such attitude adjustment devices, through the spacecraft body, to any vibration-sensitive components (e.g., optical payloads) carried by the spacecraft. Vibration isolation systems commonly include a number of individual vibration isolators (typically three to eight isolators), which are positioned between the spacecraft payload and the spacecraft body in a multi-point mounting arrangement. The performance of a vibration isolation systems is largely determined by the number of isolators included within the system, the manner in which the isolators are arranged, and the vibration attenuation characteristics of each individual isolator. Vibration isolation system employing three parameter isolators, which behave mechanically as a primary spring in parallel with a series-coupled secondary spring and damper, provide superior attenuation of high frequency vibratory forces (commonly referred to as "jitter") as compared to vibration isolation systems employing other types of passive isolators (e.g., viscoelastic isolators). The three parameter isolators are advantageously implemented as single degree of freedom ("DOF") devices, which provide damping along a single longitudinal axis. An example of a single DOF, three parameter isolator is the D-STRUT® isolator developed and commercially marketed by Honeywell, Inc., currently headquartered in Morristown, N.J.

A spacecraft isolation system may also be equipped with a number of launch lock assemblies, which are positioned between the spacecraft and the payload support structure (commonly referred to as a "palette" or "bench") in parallel with the isolators. During spacecraft launch, the launch lock assemblies maintain the payload support structure in a fixed spatial relationship with the spacecraft. In so doing, the launch lock assemblies shunt significant inertial or shock loads generated during spacecraft launch around the isolators to protect the isolators from damage that might otherwise occur. At a desired juncture after launch, the launch lock assemblies are actuated to allow relative movement between the payload support structure and the spacecraft. For example, in an implementation wherein the spacecraft isolation system includes a number of single DOF, three parameter isolators of the type described above, the isolators may be maintained in compressed state by the launch lock assemblies prior to launch. The isolators are preloaded in their compressed positions and biased toward design or free length positions. When the launch lock assemblies are released, the isolators expand axially into the design position and displace the payload support structure outward from the spacecraft body. The payload support structure, supported by or "floating on" the isolators, is now able to move relative to the spacecraft; and the isolators function collectively to dampen vibrations transmitted between the payload support structure and the spacecraft body.

BRIEF SUMMARY

Embodiments of a launch lock assembly are provided. In one embodiment, the launch lock assembly includes first and second mount pieces, a releasable clamp device, and an axial gap amplification device. The releasable clamp device normally maintains the first and second mount pieces in clamped engagement; and, when actuated, releases the first and second mount pieces from clamped engagement to allow relative axial motion therebetween. The axial gap amplification device normally residing in a blocking position wherein the gap amplification device obstructs relative axial motion between the first and second mount pieces. The axial gap amplification device moves into a non-blocking position when the first and second mount pieces are released from clamped engagement to increase the range of axial motion between the first and second mount pieces.

Embodiments of a spacecraft isolation system are further provided for deployment between a spacecraft and a payload. In one embodiment, the spacecraft isolation system includes a plurality of isolators disposed between the spacecraft and the payload in a multi-point arrangement, and at least one launch lock assembly coupled between the spacecraft and the payload in parallel with the plurality of isolators. The launch lock assembly includes first and second mount pieces, a releasable clamp device, and an axial gap amplification device. The releasable clamp device normally maintains the first and second mount pieces in clamped engagement; and, when actuated, releases the first and second mount pieces from clamped engagement to allow relative axial motion therebetween. The axial gap amplification device normally residing in a blocking position wherein the gap amplification device obstructs relative axial motion between the first and second mount pieces. The axial gap amplification device moves into a non-blocking position when the first and second mount pieces are released from clamped engagement to increase the range of axial motion between the first and second mount pieces.

BRIEF DESCRIPTION OF THE DRAWINGS

At least one example of the present invention will hereinafter be described in conjunction with the following figures, wherein like numerals denote like elements, and.

DETAILED DESCRIPTION

Figure 1:
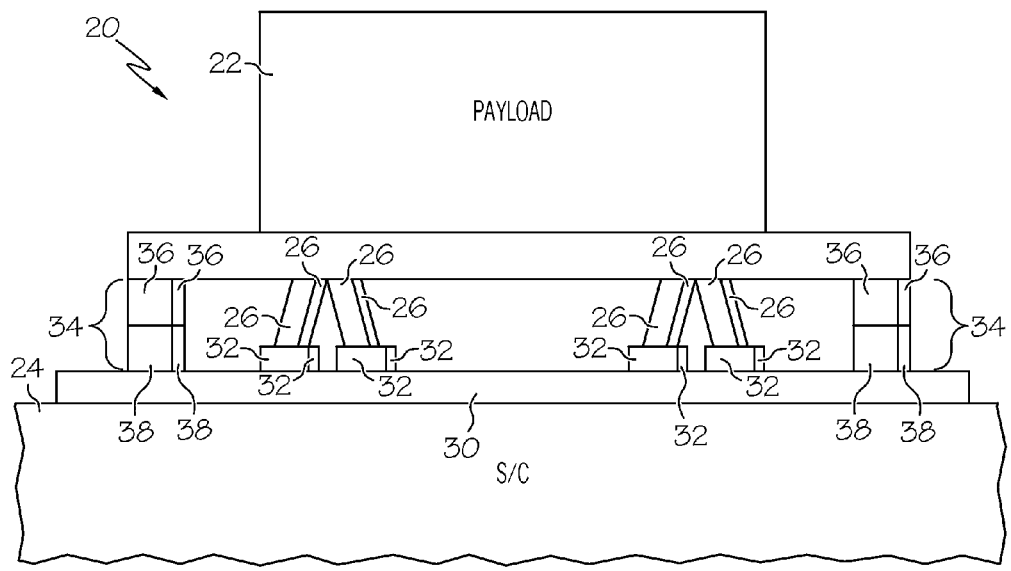
FIGS. 1 and 2 are simplified schematics of an exemplary spacecraft isolation system including a number of launch lock assemblies in locked (pre-launch) and unlocked (isolated) positions, respectively, as illustrated in accordance with an exemplary embodiment of the present invention.

The following Detailed Description is merely exemplary in nature and is not intended to limit the invention or the application and uses of the invention. Furthermore, there is no intention to be bound by any theory presented in the preceding Background or the following detailed description.

As described in the foregoing section entitled "BACKGROUND," spacecraft isolation systems are often equipped with launch lock assemblies to protect the system isolators from shock loads during launch. Pyrotechnic devices have been commonly utilized to actuate such launch lock assemblies at the desired time of deployment. However, pyrotechnic devices also tend to produce undesirably high shock forces when detonated. The assignee of the instant Application, Honeywell International Inc., has developed and commercially implemented launch lock assemblies, which produce little to no shock forces during release. In one design, each launch lock assembly includes first and second mount pieces, which are affixed to a payload support structure and to the spacecraft, respectively. A specialized bolt normally maintains the first and second mount pieces in clamped engagement. At the desired time of deployment, an actuator stretches the bolt to increase its axial length without snapping or fracturing the bolt. The stretching of the bolt releases the first and second mount pieces from clamped engagement. This allows the isolators, which were previously maintained in an axially-compressed, preloaded position by the launch lock assemblies and which are internally biased toward a normal (free length) or design position, to expand axially and move the payload support structure away from the spacecraft body. An axial gap is created between the mount pieces as the isolators expand thereby permitting relative movement between the payload support structure and the spacecraft body and proper operation of the isolators.

By effectively eliminating the generation of shock loads during release, bolt-stretch launch lock assemblies of the type described above provide a significant advantage over conventional pyrotechnically-actuated launch lock assemblies. However, absent additional features, bolt-stretch launch lock assemblies also have disadvantage not typically associated with pyrotechnically-actuated launch lock assemblies; namely, the axial gap created between the first and second mount pieces is generally limited to the increase in length directly attributable to stretching of the bolt. To overcome this limitation, the following describes embodiments of a launch lock assembly including at least one axial gap amplification device, which increases the axial width of a gap created by stretching of a bolt or other axially-stretchable member. In so doing, the below-described launch lock assemblies enable release of a spacecraft isolation system from an initial, pre-loaded position into a deployed, isolated position without the generation of significant shock forces and while allowing an increased range of axial motion between the host spacecraft and the isolated payload. Embodiments of the axial gap amplification device are particularly well-suited for usage in conjunction with bolt-stretch type clamping mechanisms and will consequently be described as such below; however, it is emphasized that the embodiments of the axial gap amplification device can be utilized in conjunction with other types of releasable clamping mechanisms.

Figure 2:
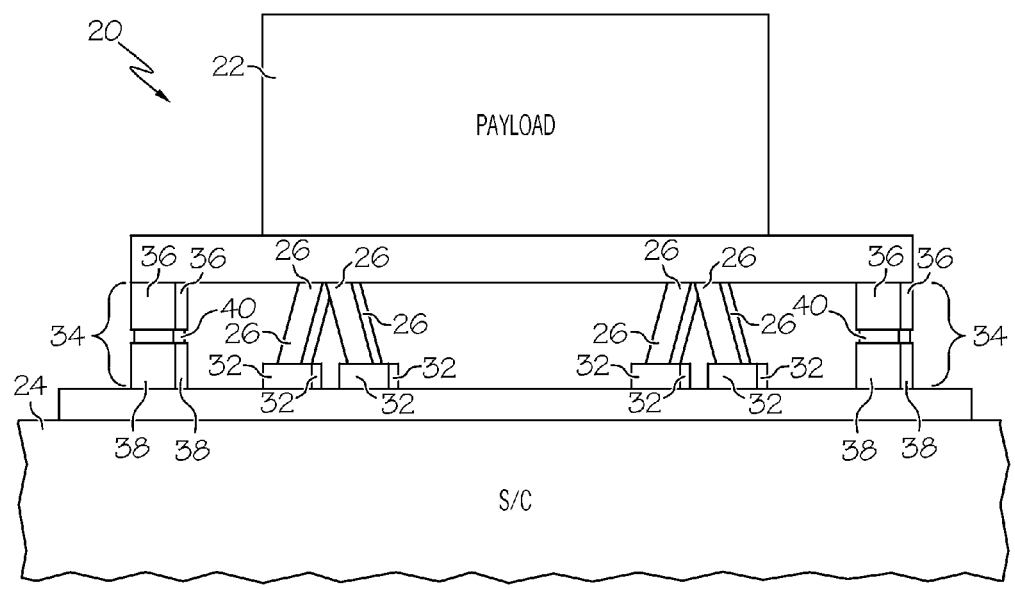

FIGS. 1 and 2 are simplified schematics of a vibration isolation system 20 in locked (pre-launch) and unlocked (design, isolated) positions, respectively, as illustrated in accordance with an exemplary embodiment of the present invention. When in the unlocked position shown in FIG. 2, vibration isolation system 20 reduces the transmission of vibrations between a payload 22 and a host spacecraft 24. In the illustrated example, isolation system 20 includes a plurality of single degree of freedom or axially-damping vibration isolators 26, which are mechanically coupled to and collectively support payload 22. More specifically, vibration isolations 26 may be pivotally coupled to a payload support structure 28, which supports the component or components included within payload 22. The opposing ends of isolators 26 are mounted to a spacecraft mounting interface 30 utilizing a plurality of mounting brackets 32, which may provide a pivot-type connection. In this particular example, isolation system 20 includes eight vibration isolators 26, which are positioned in an octopod mounting arrangement to provide high fidelity damping in six degrees of freedom. However, in further embodiments, isolation system 20 may include a lesser number or a greater number of isolators, which may be positioned in other mounting arrangements. For example, in an alternative embodiment, isolation system 20 may include six vibration isolators 26 positioned in a hexapod or Stewart platform-type mounting arrangement. Isolators 26 are preferably, although not necessarily, three parameter isolators of the type described above.

Payload 22 may include one more vibration-sensitive components, such as an optical payload or sensor suite, and isolation system 20 may serve to minimize the transmission of vibrations from a vibration-emitting source or sources aboard spacecraft 24, through spacecraft mounting interface 30, through payload support structure 28, and to payload 22. In such cases, payload support structure 28 may assume the form of an optical bench fabricated from a lightweight, high strength material, such as carbon fiber. In other embodiments, payload 22 may include one or more vibration-emitting devices, and isolation system 20 may serve to reduce the transmission of vibrations from payload 22 to spacecraft 24 and any vibration-sensitive components deployed thereon; e.g., payload 22 may include one or more rotational devices utilized in the attitude adjustment of spacecraft 24, such as one or more reaction wheels or control moment gyroscopes. For example, in one embodiment, payload 22 assumes the form of a reaction wheel array including a number of reaction wheels, and payload support structure 28 assumes the form of a support platform to which the reaction wheels are mounted in a circumferentially-spaced array.

In addition to isolators 26 and their associated mounting hardware, vibration isolation system 20 further includes a number of launch lock assemblies 34, which are mechanically or kinetically coupled between payload support structure 28 and spacecraft mounting interface 30 in parallel with isolators 26. As indicated in FIGS. 1 and 2, isolation system 20 may include four launch lock assemblies 34, which are circumferentially spaced about an outer portion of payload support structure 28; e.g., in an embodiment wherein payload support structure 28 has a generally rectangular planform shape, launch lock assemblies 34 may be positioned at or near the four corners of structure 28. It will be understood, however, that the number and positioning of launch lock assemblies 34 will inevitably vary amongst different embodiments and that assemblies 34 will typically be spaced so as to provide a desired natural frequency of the payload when in the locked configuration. Launch lock assemblies 34 are generically illustrated in FIGS. 1 and 2 as each including a first mount piece 36 (also referred to as a "top mount") and a second mount piece 38 (also referred to as a "base"). When mount pieces 36 and 38 are in clamped engagement, as illustrated in FIG. 1, launch lock assemblies 34 fix or lock the spatial position of payload support structure 28 and payload 22 relative to spacecraft 24. When in this locked position (FIG. 1), launch lock assemblies 34 collectively maintain isolators 26 in an axially-compressed, preloaded state and against an internal bias urging each isolator 26 toward its non-compressed or design position. Thus, in the locked position (FIG. 1), launch lock assemblies 34 provide rigid and structurally-robust force transmission paths for effectively shunting shock loads around isolators 26 to protect isolators 26 from damage during spacecraft launch.

At a desired time of deployment occurring subsequent to spacecraft launch, launch lock assemblies 34 are actuated to release mount pieces 36 and 38 from clamped engagement. No longer maintained in their axially-compressed state by launch lock assemblies 34, isolators 26 are free to expand into their design positions and displace payload support structure 26 outward from the body of spacecraft 24. As isolators 26 expand, each pair of mount pieces 36 and 38 separate to form an axial gap 40 therebetween (generically shown in FIG. 2). Relative axial movement is now permitted between mount pieces 36 and 38, and isolators 26 are able to compress and expand in conjunction with relative movement between payload support structure 28 (or, more generally, payload 22) and spacecraft 24. It is generally desirable to maximize the axial length of gaps 40 to provide isolators 26 with a sufficient range of axial range to optimize the damping performance of multi-point isolation system 20. However, to reduce or eliminate undesired shock forces during release, each launch lock assembly 34 is also preferably equipped with a bolt-stretch actuator (or a similar device) of the type described below, which may provide only a relatively limited axial displacement between mount pieces 36 and 38 upon actuation. To overcome this limitation and provide isolators 26 with a greater displacement range over which to operate, launch lock assemblies 34 are each equipped with at least one axial gap amplification device, which increases the length of the axial gap created by release of each pair of mount pieces 36 and 38. An example of launch lock assembly including such an axial gap amplification device and suitable for usage as one or all of launch lock assemblies 34 is described in detail below in conjunction with FIGS. 3-12.

Figure 3:
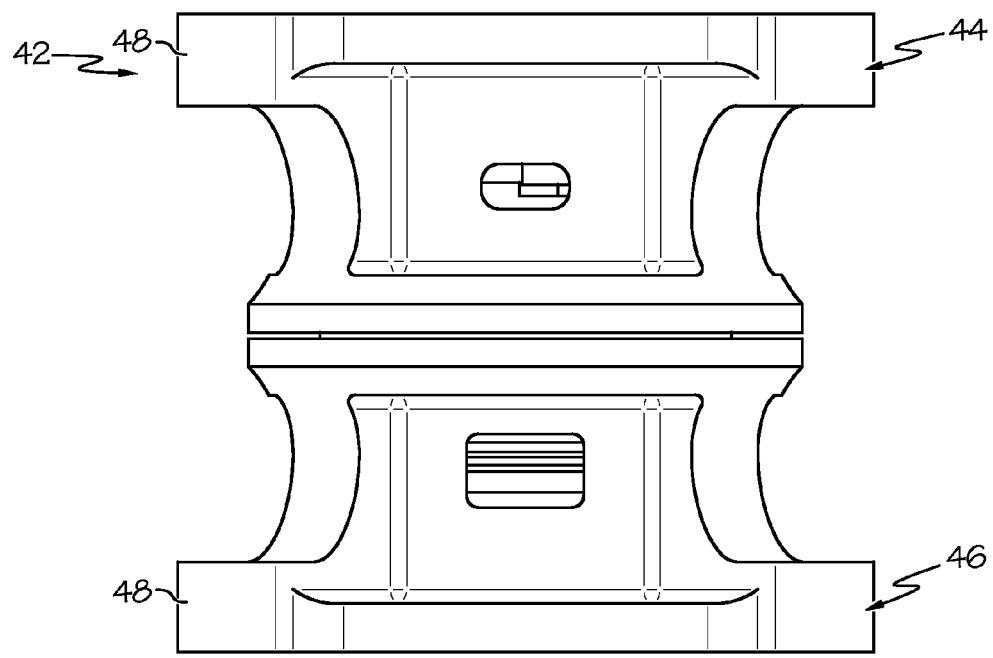
FIGS. 3 and 4 are side and top views, respectively, of a launch lock assembly in a locked position, suitable for usage as one or all of the launch lock assemblies shown in FIGS. 1 and 2, and illustrated in accordance with an exemplary, non-limiting embodiment of the present invention.
Figure 4:
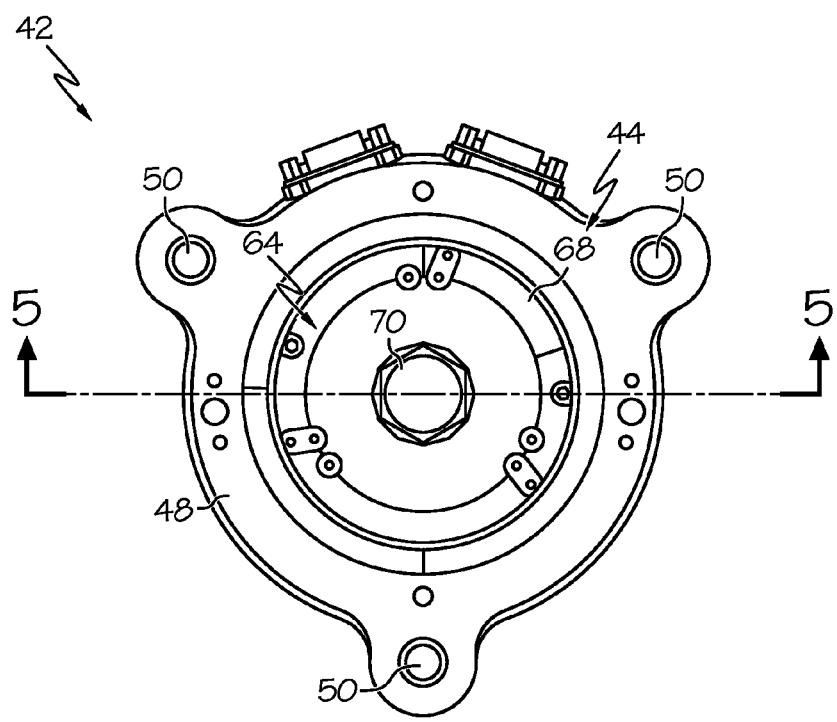
Figure 5:
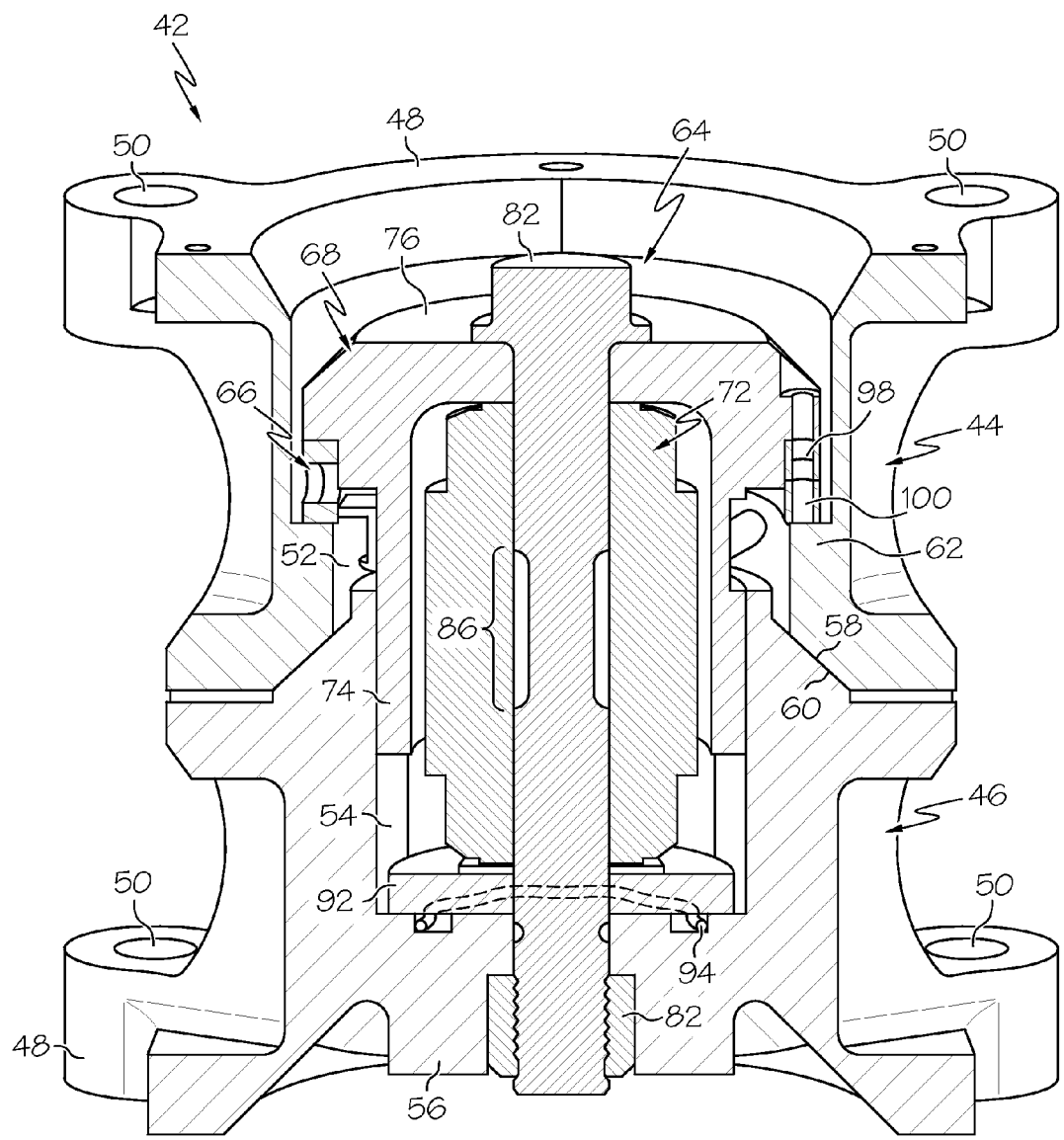
FIG. 5 is a cross-sectional view of the launch lock assembly shown in FIGS. 3 and 4 and taken along line 5-5 identified in FIG. 4.

FIGS. 3 and 4 are side and top views, respectively, of a launch lock assembly 42 in a locked position and illustrated in accordance with an exemplary, non-limiting embodiment of the present invention. FIG. 5 is a cross-sectional view of launch lock assembly 42, as taken along line 5-5 identified in FIG. 4. For convenience of explanation, terms of direction will be utilized in the following description, such as "upper," "lower," and the like, corresponding to the orientation of launch lock assembly shown in FIGS. 3 and 5. It should be understood, however, that the orientation of launch lock assembly 42 can be varied in three dimensional space and thus is largely arbitrary. Referring collectively to FIGS. 3-5, launch lock assembly 42 includes an upper mount piece 44 and a lower mount piece 46. When installed within a multi-point isolation system, a first end of launch lock assembly 42 is directly or indirectly attached to a payload; and a second, opposing end of launch lock assembly 42 is directly or indirectly attached to the spacecraft body. For example, the outer end of upper mount piece 44 (i.e., the upper end of mount piece 44 in FIGS. 3 and 5) may be attached to payload support structure 28 shown in FIGS. 1 and 2, while the outer end of lower mount piece 46 (i.e., the lower end of mount piece 44 in FIGS. 3 and 5) is attached to spacecraft mounting interface 30 shown in FIGS. 1 and 2. Conversely, the outer end of mount piece 44 may be attached to spacecraft mounting interface 30 (FIGS. 1 and 2), while the outer end of mount piece 46 is attached to payload support structure 28 (FIGS. 1 and 2). To facilitate attachment utilizing a plurality of bolts or other such fasteners (not shown), the outer ends of mount pieces 44 and 46 may each be fabricated to include a circumferential flange 48 having a plurality of fastener openings 50 therein (shown in FIGS. 4 and 5).

In the illustrated example, and as may be appreciated most easy by referring to FIG. 5, mount pieces 44 and 46 each have a substantially tubular or annular geometry. Upper mount piece 44, specifically, has a generally tubular body through which a generally cylindrical inner bore or cavity 52 extends. Inner cavity 52 extends entirely through mount piece 44 such that the opposing ends of mount piece 44 are both open. The tubular body of lower mount piece 46 likewise defines a generally cylindrical inner bore or cavity 54; however, inner cavity 54 does not extend entirely through lower mount piece 46 and is instead enclosed by a lower terminal endwall 56 provided near the mounting flange 48 of mount piece 46. Thus, generally stated, lower mount piece 46 has an open upper end and a closed lower end. Stated differently, the neighboring or axially-adjacent ends of upper mount piece 44 and lower mount piece 46 are both open and collectively define a central cavity within launch lock assembly 42 that houses the various other components of assembly 42 (described below). Mount pieces 44 and 46 are each preferably fabricated as a single, machined component from a lightweight metal or alloy, such as an aluminum-based alloy. This example notwithstanding, mount pieces 44 and 46 may be formed from various other materials and may each be assembled from multiple, discrete structural components in alternative embodiments. In addition, the dimensions and geometry of upper and lower mount pieces 44 and 46 may vary, and mount pieces 44 and 46 may not house all or any of the other components included within launch lock assemblies 42 in alternative embodiments.

Mount pieces 44 and 46 are positioned in a co-axial, end-to-end arrangement such that cavities 52 and 54 aligned in an axial direction; that is, as taken along the longitudinal axis of launch lock assembly 42. In the locked position shown in FIGS. 3-5, the neighboring end portions of mount pieces 44 and 46 abut. More specifically, upper mount piece 44 includes a first contact surface 58, which seats on a second contact surface 60 provided on lower mount piece 46 when launch lock assembly 42 is in the locked position. Contact surface 58 is defined, at least in part, by an inner annular protrusion 62 provided around the interior of lower end portion of lower mount piece 44 and within internal cavity 52. By comparison, contact surface 60 is defined by a raised annular rim provided around and extending axially from the upper end portion of lower mount piece 46 toward upper mount piece 44. Contact surfaces 58 and 60 each preferably have a generally annular geometry. In the illustrated example, contact surfaces 58 and 60 are fabricated to have corresponding frustoconical geometries to provide radial alignment and to react shear loads perpendicular to the bolt axis.

In addition to mount pieces 44 and 46, launch lock assembly 42 further includes a releasable clamp device 64 (shown in FIGS. 4 and 5) and at least one axial gap amplification device 66 (shown in FIG. 5). Releasable clamp device 64 can assume any form and may include any number of components suitable for maintaining mount pieces 44 and 46 (and, specifically, frustoconical contact surfaces 58 and 60) in clamped engagement until a desired time of deployment. Releasable clamp device 64 is ideally relatively lightweight, compact, and reliable. It is also generally preferred that, in contrast to certain known pyrotechnically-actuated clamping devices, releasable clamp device 64 generates little to no shock forces upon actuation. To this end, and by way of non-limiting example, releasable clamp device 64 may include at least three main components: (i) a sliding clamp member 68 (shown in FIGS. 4 and 5); (ii) an axially-stretchable structural element or elements, such as an axially-stretchable bolt 70 (shown in FIGS. 4 and 5); and (iii) an actuator suitable for stretching the axially-stretchable structural element in a controlled manner at the desired time of deployment, such as bolt-stretch actuator 72 (shown in FIG. 5). Each of these components is described, in turn, below.

Figure 6:
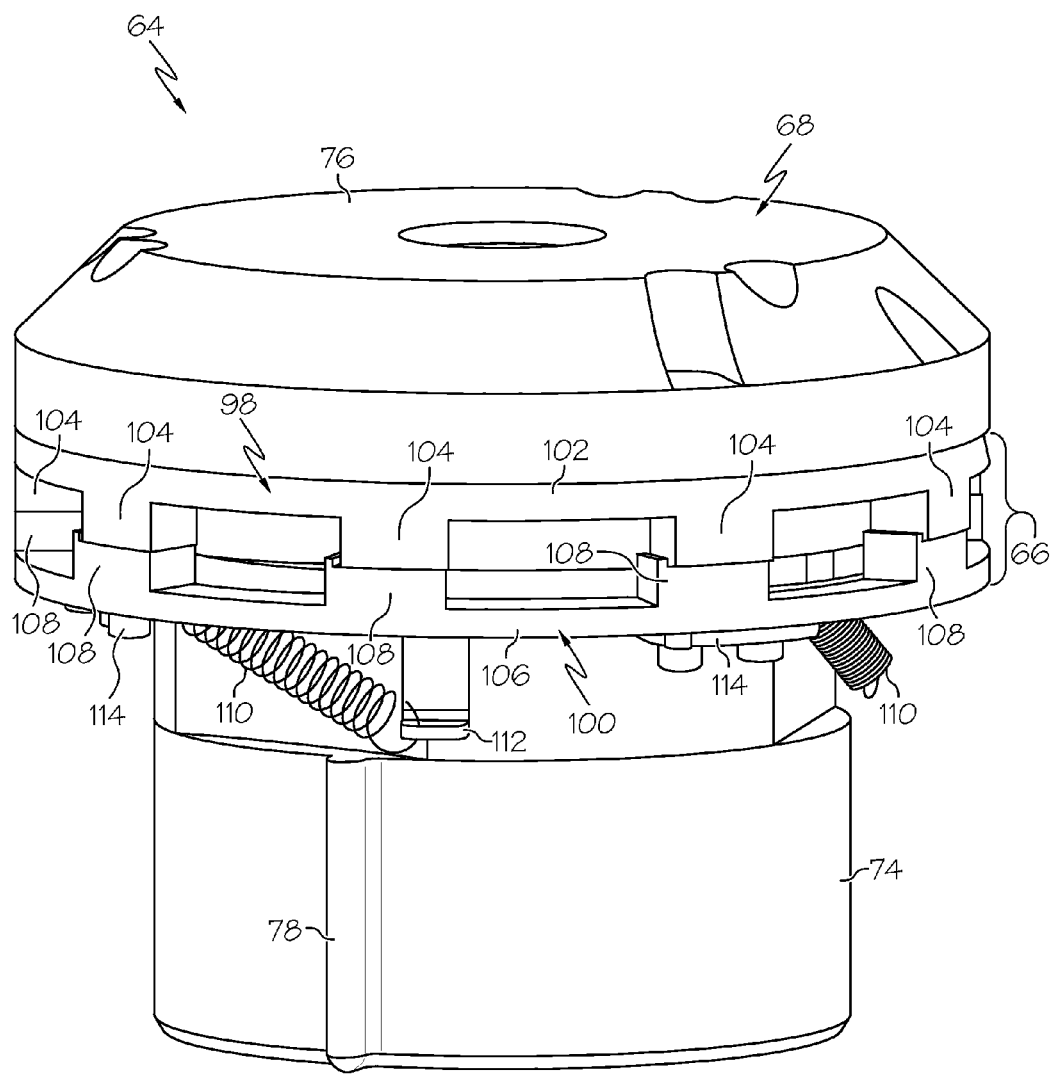
FIG. 6 is an isometric view of a releasable clamp device and an axial gap amplification device that may be included within the exemplary launch lock assembly shown in FIGS. 3-5.
Figure 7:
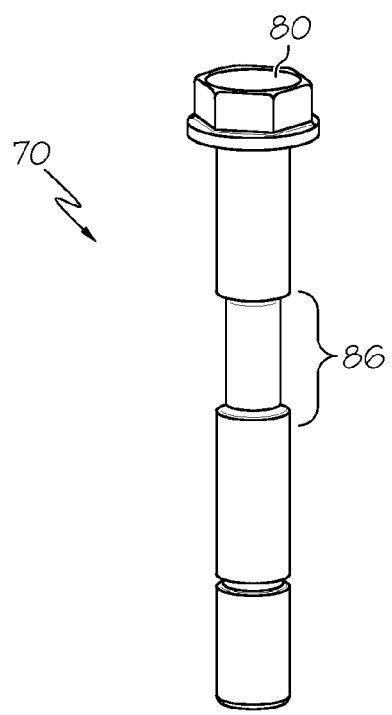
FIG. 7 is an isometric view of an axially-stretchable bolt that may be included within the exemplary launch lock assembly shown in FIGS. 3-5.
Figure 8:
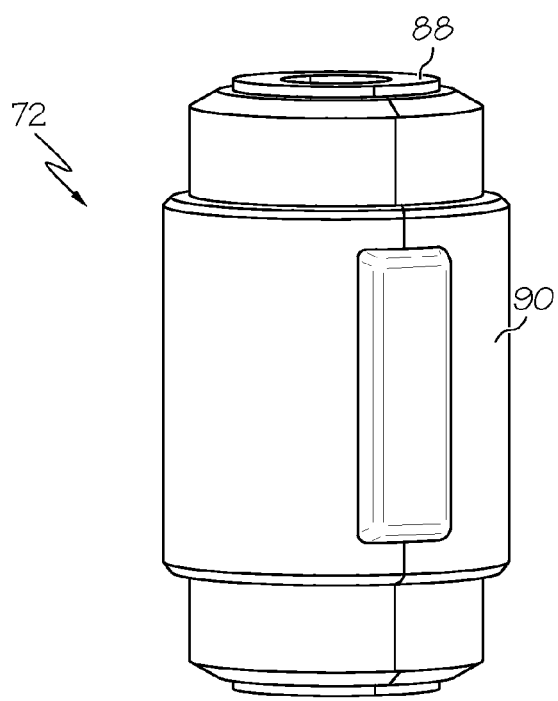
FIG. 8 is an isometric view of a shape memory alloy bolt-stretch actuator that may be included within the exemplary launch lock assembly shown in FIGS. 3-5 and disposed around the axially-stretchable bolt shown in FIG. 7.

FIG. 6 is an isometric view of releasable clamp device 64 and axial gap amplification device 66 illustrating sliding clamp member 68 in greater detail. Referring jointly to FIGS. 5 and 6, sliding clamp member 68 includes an elongated, tubular body 74 and a radially-enlarged, cylindrical head or cap 76. Cylindrical cap 76 is affixed to the upper end of tubular body 74 and may be integrally formed therewith as a single machined piece. Tubular body 74 extends axially from cap 76 in a downward direction, toward lower mount piece 46, and into cavity 54. Tubular body 74 is able to slide axially within cavity 54 such that clamp member 68 can slide axially with respect to lower mount piece 46. Tubular body 74 is advantageously fabricated to have an outer diameter and geometry substantially conformal to the inner diameter and geometry of cavity 54, respectively, to guide the sliding movement of sliding clamp member 68. Rotation of tubular body 74 relative to lower mount piece 46, and thus rotation of sliding clamp member 68 relative to lower mount piece 46, is prevented by one or more anti-rotation features. For example, as shown in FIG. 7, tubular body 74 may be fabricated to include a key 78, which travels within a mating longitudinal keyway (not shown) formed within the inner annular surface bounding cavity 54 when clamp member 68 slides axially relative to lower mount piece 46.

Axially-stretchable bolt 70 extends through axially-aligning openings provided through cap 76 of sliding clamp member 68 and through terminal endwall 56 of lower mount piece 46. Axially-stretchable bolt 70 extends along an axis substantially parallel to and, preferably, substantially co-linear with the longitudinal axis of launch lock assembly 42. The upper end of axially-stretchable bolt 70 terminates in a radially-enlarged head 80, which abuts the upper surface of cap 76 proximate the central opening provided therein. A nut 82 is threaded onto the lower end of bolt 70 and may be received within a cylindrical counter-bore provided within terminal endwall 56, as generally shown in FIG. 5. During assembly of launch lock assembly 42, nut 82 is tightened to a predetermined torque load such that nut 82 exerts an axial preload force on mount piece 46 in the direction of sliding clamp member 68. Also, as a result of the tightening of nut 82, bolt head 80 exerts an axial preload force on sliding clamp member 68 in the direction of lower mount piece 46. This axial preload force is transferred to upper mount piece 44. For example, the underside of radially-enlarged cap 76 may abut axial gap amplification device 66, which, in turn, abuts an annular clamp surface 84 provided around the interior of upper mount piece 44. As illustrated in FIG. 5, annular clamp surface 84 may be defined by the upper surface of inner annular protrusion 62 formed within upper mount piece 44 and located opposite lower frustoconical contact surface 58. Due to this structural configuration, convergent axial preload forces are exerted on mount pieces 44 and 46 to maintain contact surfaces 58 and 60 in clamped engagement.

Axially-stretchable bolt 70 is selected to have a sufficient tensile strength to maintain mount pieces 44 and 46 in clamped engagement in the event of significant shock loads and other disturbances forces generated during spacecraft launch or transport. Axially-stretchable bolt 70 is also designed to yield when subjected to a predetermined tensile force such that bolt 70 stretches to provide a desired increase in length without snapping or fracturing. The tensile strength of bolt 70 may controlled by varying the outer diameter of the bolt shank and the material from which bolt 70 is fabricated. In one embodiment, and by way of non-limiting example, bolt 70 is fabricated from a steel alloy, such as A286. Additionally, the tensile strength of bolt 70 may be fine-tuned by removing material from around a mid-portion of the bolt shank to decrease the outer diameter thereof in a controlled manner (commonly referred to as "necking"). The resulting structure, wherein bolt 70 has a reduced outer diameter or "stepped-down" intermediate portion, is shown in FIG. 5 at 86. Axially-stretchable bolt 70 is further illustrated in FIG. 7.

Various different devices can be utilized as bolt-stretch actuator 72, providing that such devices can be reliably actuated at the desired time of deployment to stretch bolt 70 and release mount pieces 44 and 46 from clamped engagement in the manner described below. It is generally preferred, however, that bolt-stretch actuator 72 is able to provide a relatively high output force in a small, lightweight package. For at least this reason, bolt-stretch actuator 72 may be a shape memory alloy ("SMA") device. In the exemplary embodiment illustrated in FIGS. 3-5, and as illustrated in greater detail in FIG. 8, bolt-stretch actuator 72 includes a SMA core 88 (identified in FIG. 8) and a circuit heater 90, which circumscribes or is wrapped around SMA core 88. SMA core 88 may be fabricated from Nitinol® or another known shape memory alloy. SMA core 88 has generally tubular body through which a central channel or bore extends. SMA core 88 is disposed around axially-stretchable bolt 70, which passes through the longitudinal channel of core 88. To optimize the efficiency with which SMA core 88 is heated, SMA core 88 and circuit heater 90 may be encapsulated in thermal insulation. In addition, as shown in FIG. 5, a thermally-insulating washer 92 may be disposed between terminal endwall 56 of lower mount piece 46 and bolt-stretch actuator 72.

Prior to actuation, SMA core 88 resides in an axially-compressed state. Upon heating to a predetermined transition temperature by heater 90, SMA core 88 expands in an axial direction to exert an expansion force on axially-stretchable bolt 70 through sliding clamp member 68. The output force of bolt-stretch actuator 72 is sufficient to stretch bolt 70 and increase the length thereof by a predetermined amount; e.g., as a non-limiting example, SMA core 88 may stretch bolt 70 by about 0.054 inch when actuated. Circuit heater 90 may be energized at the desired time of actuation by a controller (not shown) electrically connected to heater 90 by wired connection extending through a window 96 provided in the annular sidewall of lower mount piece 46 (shown in FIG. 3). A resilient element, such as a wave spring 94, is further provided within cavity 54 and compressed between insulating washer 92 and terminal endwall 56 to retain bolt-stretch actuator 72 against cap 76 of sliding clamp member 68 after heating and subsequent cooling and axial contraction of SMA core 88.

Axial gap amplification device 66 will now be described in conjunction with the exemplary embodiment of launch lock assembly 42 shown in FIGS. 3-8. Axial gap amplification device 66 is provided by way of example only. In alternative embodiments, axial gap amplification device 66 can assume other forms including at least one movable member that: (i) normally resides in a blocking position wherein the member obstructs relative axial motion between mount pieces 44 and 46, and (ii) that moves into a non-blocking position when mount pieces 44 and 46 are released from clamped engagement by actuation of a releasable clamp device, such as clamp device 64 shown in FIGS. 4-6 to increase the range of axial motion between the mount pieces. The axial gap amplification device (specifically, the movable member) may be biased toward the non-blocking position and retained in the blocking position by the releasable clamp device prior to actuation due to preload forces. In preferred embodiments, axial gap amplification device 66 includes first and second contrate rings, at least one of which can rotate relative to the other to move from the blocking position into the non-blocking position, as described below. Axial gap amplification device 66 can also include other types of toothed members, such as two or more castellated rails, that are able to slide relative to one another to move from a blocking position to a non-blocking position in alternative embodiments. In the illustrated exemplary embodiment, launch lock assembly 42 includes a single axial gap amplification device 66 to reduce part count, complexity, and cost; however, in further embodiments, launch lock assembly 42 can include two or more axial gap amplification devices in further embodiments to increase total displacement between mount pieces 44 and 46 and/or to provide redundancy.

In the exemplary embodiment shown in FIGS. 3-8, and referring specifically to FIG. 6, axial gap amplification device 66 includes an upper contrate ring 98 and a lower contrate ring 100 (again, the terms "upper" and "lower" utilized in a non-limiting sense as a convenient means of describing the exemplary embodiment illustrated by the accompanying drawings). The term "contrate ring," as appearing herein, denotes a generally annular structure having a plurality of teeth, castellations, or like projections that extend from the body of the annular structure in a generally axial direction. As shown in FIG. 6, upper contrate ring 98 may include an annular body 102 from which a plurality of block-shaped teeth 104 extend in an axial direction and toward lower contrate ring 100. Lower contrate ring 100 may likewise include an annular body 106 from which a plurality of block-shaped teeth 108 extend in an axial direction and toward upper contrate ring 98. Contrate rings 98 and 100 each extend around releasable clamp device 64, and specifically around tubular body 74 of sliding clamp member 68. Opposite lower contrate ring 100, annular body 102 of upper contrate ring 98 is affixed to the underside of enlarged cap 76 of sliding clamp member 68. For example, upper contrate ring 98 may attached to cap 76 of sliding clamp member 68 utilizing a plurality of fasteners (not shown), welded or soldered thereto, or otherwise joined thereto. Alternatively, upper contrate ring 98 may be integrally formed with cap 76 of sliding clamp member 68 as a singe, unitary part.

Figure 9:
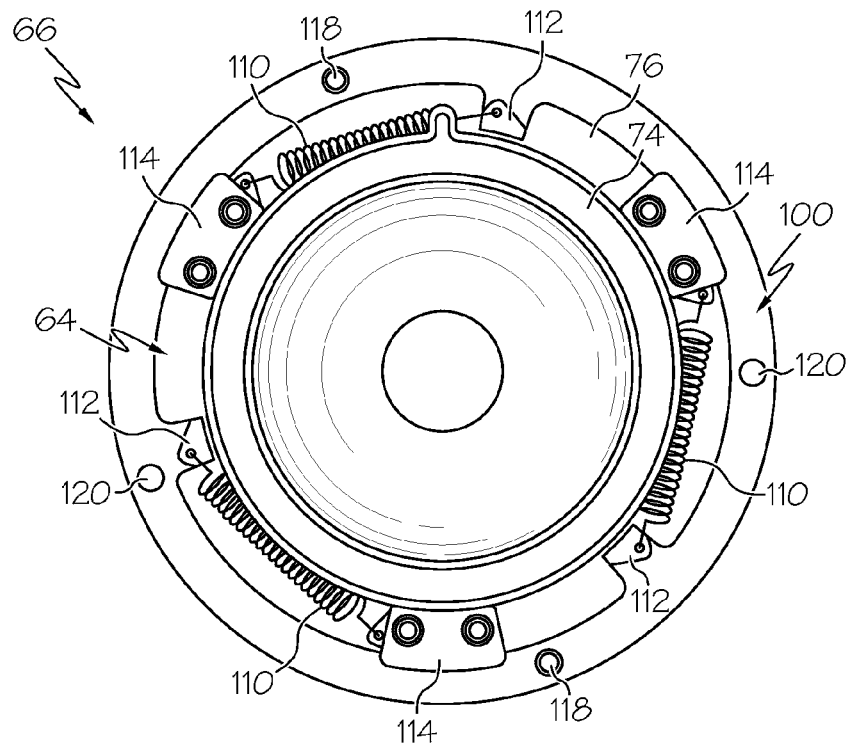
FIG. 9 is a bottom view of the releasable clamp device and axial gap amplification device shown in FIG. 6.
Figure 10:
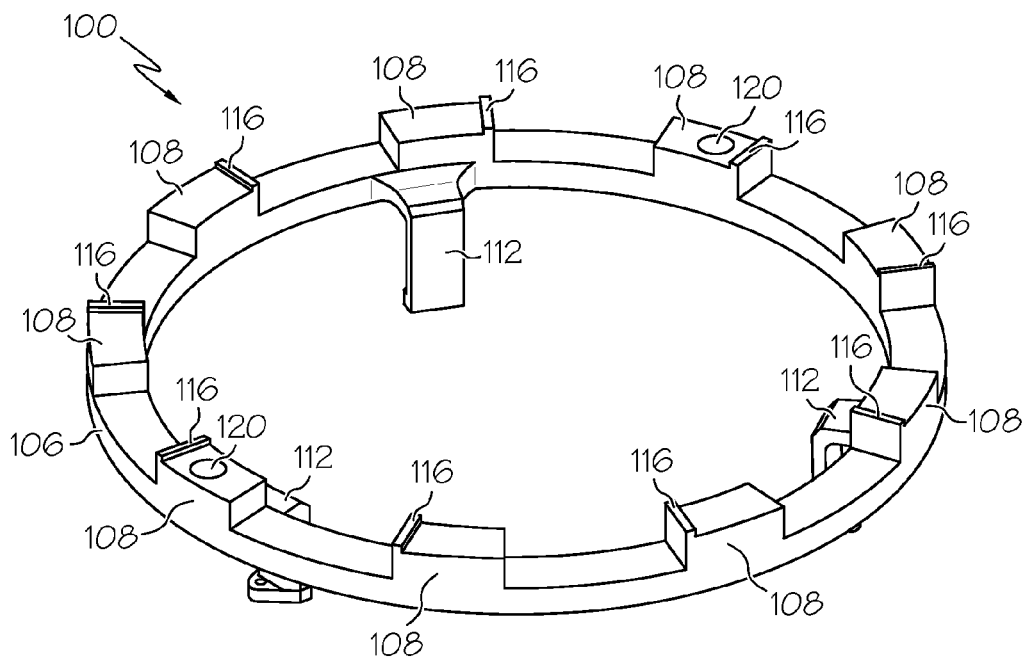
FIG. 10 is an isometric view of a lower contrate ring that may be included within the axial gap amplification device shown in FIGS. 6 and 9.

Upper contrate ring 98 is rotationally fixed with respect to sliding clamp member 68. In contrast, lower contrate ring 100 is able to rotate relative to sliding clamp member 68 and upper contrate ring 98. More specifically, lower contrate ring 100 is able to rotate from the blocking position shown in FIG. 6 into a non-blocking position shown in FIG. 12 and described more fully below. Additionally, lower contrate ring 100 is able to slide axially toward upper contrate ring 98 when moving into the non-blocking position (FIG. 12) to allow axial gap amplification device 66 to contract or collapse in an axial direction and thereby provide additional axial clearance. Lower contrate ring 100 normally resides in the blocking position (FIG. 6) and is biased toward the non-blocking position by a plurality of extension springs 110. Extension springs 110 are further shown in FIG. 9, which is a bottom view of sliding clamp member 68 and axial gap amplification device 66. As can be seen in FIGS. 6 and 9, extension springs 110 are stretched between a number of hooked axial projections 112, which extend from annular body 106 of lower contrate ring 100 in a generally downward direction and away from upper contrate ring 98; and a plurality of attachment flanges 114, which are affixed to the underside of cap 76 of sliding camp member 68. Extension springs 110 exert a torsional bias on lower contrate ring 100 urging rotation of ring 100 toward the non-block position (described below). Furthermore, due to their angled disposition, extension springs 110 also exert an axial bias on lower contrate ring 100 urging the sliding movement of contrate ring 100 toward upper contrate ring 98. This example notwithstanding, lower contrate ring 100 can be biased utilizing other means, such as one or more torsion springs or bars, in alternative embodiments. To prevent over-rotation of lower contrate ring 100 in a direction away from the non-blocking position (FIG. 12), a hardstop feature may be provided on one or more of teeth 108. For example, as shown in FIG. 10, which illustrates lower contrate ring 100 in isolation, each tooth 108 of lower contrate ring 100 may be machined or otherwise fabricated to include a small axial steps 116 preventing over-rotation beyond the non-blocking position.

Figure 11:
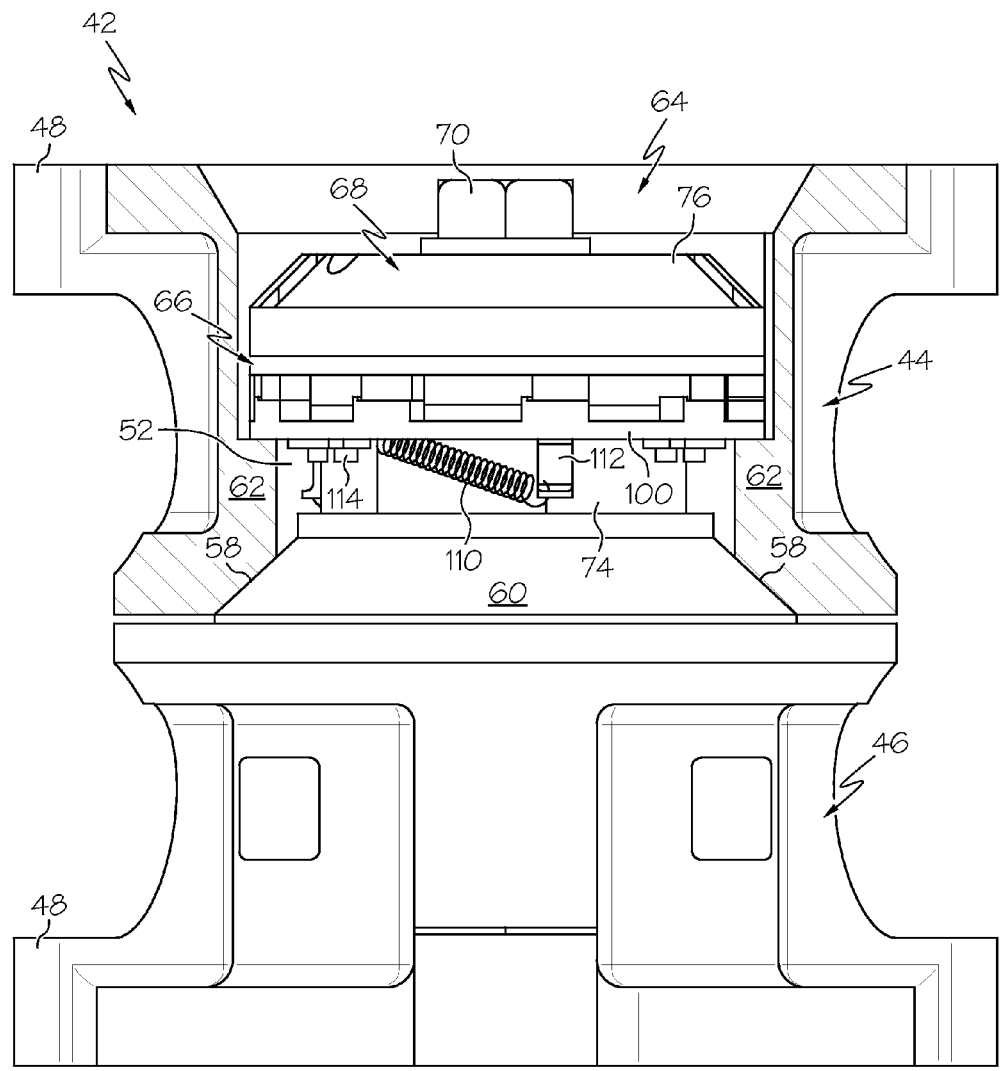
FIGS. 11 and 12 are partial cutaway views of the launch lock assembly shown in FIGS. 3 and 5 in locked and unlocked positions, respectively.
Figure 12:
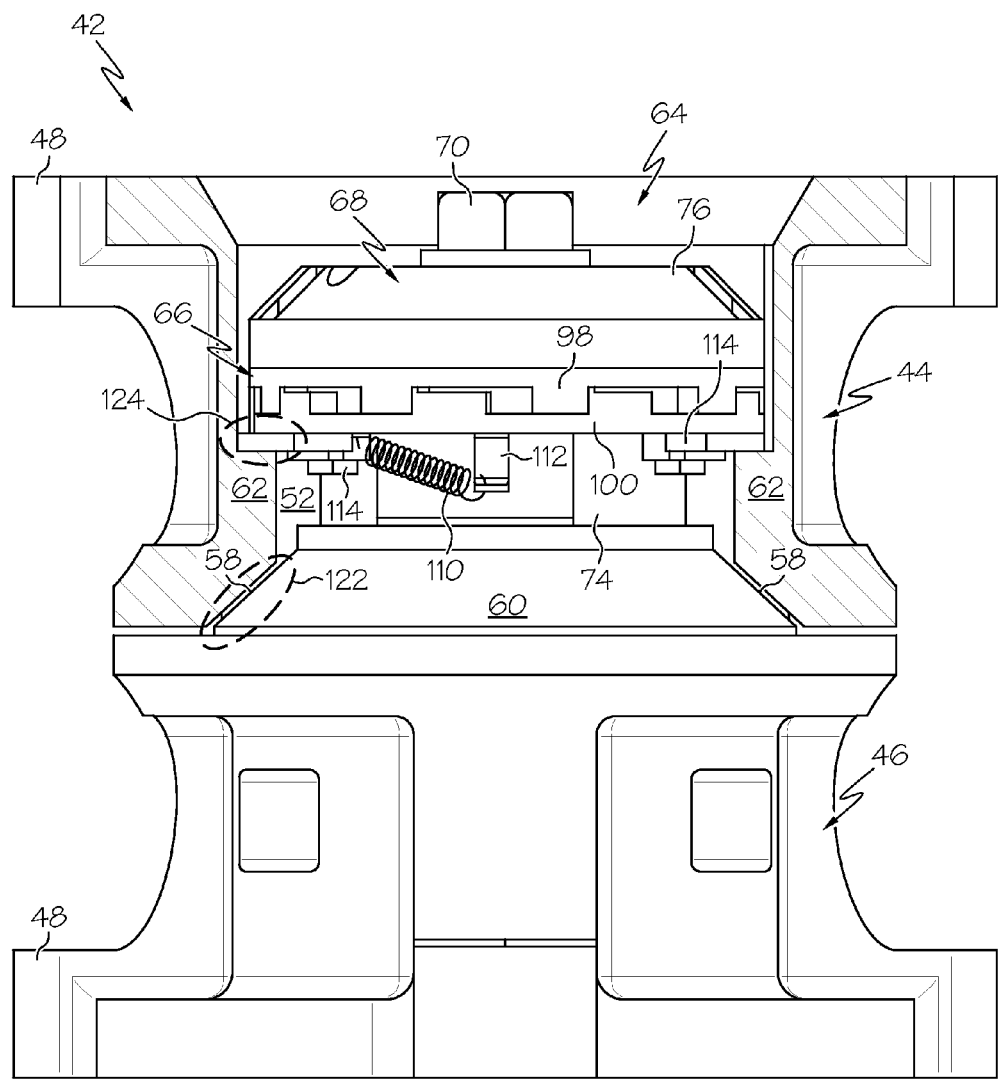

FIGS. 11 and 12 are isometric views of launch lock assembly 42 in locked and unlocked (design) positions, respectively, in which upper mount piece 44 is shown in cutaway. In the locked position shown in FIG. 11, lower contrate ring 100 of axial gap amplification device 66 is in the blocking position. In this position, the teeth of lower contrate ring 100 are in tip-to-tip engagement with the teeth of upper contrate ring 98 such that device 66 resides in an axially expanded position. Although biased toward non-blocking position shown in FIG. 12 by extension springs 110, lower contrate ring 100 is prevented from rotating into the non-blocking position by frictional forces or, more specifically, by an axial clamping force exerted on gap amplification device 66 in view of its disposition between sliding clamp member 68 and annular clamp surface 84. Inner annular protrusion 62 is captured or retained between lower contrate ring 100 and frustoconical contact surface 60 of lower mount piece 46, and relative axial movement between mounts pieces 44 and 46 is prevented. To further help retain lower contrate ring 100 in the non-blocking position (FIG. 11) prior to launch lock actuation, contrate rings 98 and 100 may be machined or otherwise fabricated to include one or more positive register features, such as a number of slightly raised protrusions or bosses 118 (partially shown in FIG. 9) provided in one of ring 98 and 100 that matingly engage a corresponding number of openings or pin holes 120 (partially shown in FIGS. 9 and 10) provided in the other ring 98 and 100 when lower contrate ring 100 is in the blocking position (FIG. 11).

At the desired time of deployment, releasable clamp device 64 is actuated in the previously-described manner; that is, bolt-stretch actuator 72 is energized to stretch bolt 70 and allow sliding movement clamp member 68 away from lower mount piece 46 (upward in the illustrated orientation). As indicated above, sliding movement of clamp member 68 is driven by an external bias force as may be provided by an isolator preloaded. Movement of sliding clamp member 68 and, specifically, radially-enlarged cap 76 away from lower mount piece 46 release mount pieces 44 and 46 from clamped engagement. So released, upper mount piece 44 now axially diverges or separate from lower mount piece 46 and an axial gap develops between contact surfaces 58 and 60, as indicated in FIG. 12 by circle 122. Also, as sliding clamp member 68 slides axially away from lower mount piece 46, the axial clamping force that previously maintained lower contrate ring 100 in the blocking position is removed. Lower contrate ring 100 is thus permitted to rotate and slide axially into the non-blocking position shown in FIG. 12 under the influence of extension springs 110. In the non-blocking position, the teeth of lower contrate ring 100 rotate into an interlocking or meshing position with the teeth of upper contrate ring (the teeth of contrate rings 98 and 100 rotate into tooth-to-root engagement) such that contrate rings 98 and 100 axially contract or collapse and the effective axial height of gap amplification device 66 is reduce. In this manner, axial gap amplification device 66 provides additional axial clearance between lower contrate ring 100 and frustoconical contact surface 60 to increase the range of available axial motion between mount pieces 44 and 46, as indicated in FIG. 12 by circle 124. In one embodiment, this additional axial clearance may have an axial length of about 0.125 inch, which, while being relatively modest in a general sense, may represent more than a threefold increase in available gap width for relative axial motion of mount pieces 44 and 46.

In a strict sense, lower contrate ring 100 will still abut and impede axial movement of upper mount piece 44 in the non-blocking position shown in FIG. 12 should a relatively large axial displacement occur between mount pieces 44 and 46. Considering this, it should be understood that the term "non-blocking" is utilized herein in a relative sense to indicate that contrate ring 100 (or a like movable member included with an axial gap amplification device) is less obstructive in the "non-blocking" position and thereby allows a greater range of axial motion between mount pieces 44 and 46 than in the blocking position. Although not shown in FIGS. 11 and 12, launch lock assembly 42 may further be equipped with one or more soft stop features to reduce any shock forces produced by the snap-action of lower contrate ring 100 when rotating into the non-blocking position (FIG. 12).

The foregoing has thus provided exemplary embodiments of a launch lock assembly suitable for usage within a multi-point vibration isolation system. The launch lock assembly includes at least one axial gap amplification device, which increases the axial width of the gap created by separation of neighboring mount pieces upon actuation of a releasable clamp device to increase the available range of axial motion between the first and second mount pieces and thereby provide the system isolator with a greater displacement range over which to operate. As described above, the axial gap amplification device is especially well-suited for use in conjunction with a bolt-stretch clamping device of the type described above; however, embodiments of the axial gap amplification device may also be utilized with other types of releasable clamp devices, as well. In preferred embodiments, the gap amplification device includes at least two toothed or castellated sliding members (e.g., contrate rings), which normally reside in an axially-expanded position, which are biased toward an axially-collapsed position, and which are preloaded to maintain the sliding members in the axially-expanded position until actuation of the releasable clamp device.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:

1. A launch lock assembly, comprising:
   first and second mount pieces;
   a releasable clamp device normally maintaining the first and second mount pieces in clamped engagement and, when actuated, releasing the first and second mount pieces from clamped engagement to allow relative axial motion therebetween; and
   an axial gap amplification device normally residing in a blocking position wherein the gap amplification device obstructs relative axial motion between the first and second mount pieces, the axial gap amplification device moving into a non-blocking position when the first and second mount pieces are released from clamped engagement to increase the range of axial motion between the first and second mount pieces.

2. A launch lock assembly according to claim 1 wherein the releasable clamp device comprises:
   an axially-stretchable member normally maintaining the first and second mount pieces in clamped engagement; and
   an actuator proximate the axially-stretchable member and, when actuated, stretching the axially-stretchable member in an axial direction to release the first and second mount pieces from clamped engagement.

3. A launch lock assembly according to claim 2 wherein the axially-stretchable member comprises an axially-stretchable bolt, and wherein the actuator comprises a shape memory alloy actuator.

4. A launch lock assembly according to claim 1 wherein the axial gap amplification device is biased toward the non-blocking position.

5. A launch lock assembly according to claim 4 wherein the releasable clamp device exerts a preload on the axial gap amplification device preventing movement of the axial gap amplification device into the non-blocking position when the first and second mount pieces are in clamped engagement.

6. A launch lock assembly according to claim 4 wherein the axial gap amplification device comprises:
   a first toothed member; and
   a second toothed member normally residing in a first position wherein the teeth of the second toothed member and the teeth of the first toothed member are in tip-to-tip engagement, the second toothed member able to slide with respect to the first toothed member into a second position wherein the teeth of the second toothed member and the teeth of the first toothed member are in root-to-tip engagement.

7. A launch lock assembly according to claim 6 wherein the axial gap amplification device further comprises at least one spring biasing the second toothed member toward the second position.

8. A launch lock assembly according to claim 7 wherein the at least one spring comprises a plurality of springs coupled between the second toothed member and the releasable clamp device, the plurality of springs biasing the second toothed member in a rotational and axial direction corresponding to the second position.

9. A launch lock assembly according to claim 8 wherein the first toothed member comprises a first contrate ring, and wherein the second toothed member comprises a second contrate ring.

10. A launch lock assembly according to claim 9 wherein the first and second contrate rings extend around the releasable clamp device.

11. A launch lock assembly according to claim 1 wherein the first mount piece comprises:
a generally tubular body having a central opening within which the releasable clamp device and the axial gap amplification device are disposed; and
an inner annular projection extending radially inward from the generally tubular body to engage the axial gap amplification device when the first and second mount pieces are in clamped engagement.

12. A launch lock assembly according to claim 11 wherein the inner projection is captured between axial gap amplification device and the second mount piece when the first and second mount pieces are in clamped engagement.

13. A launch lock assembly according to claim 12 wherein the releasable clamp device comprises a sliding clamp member slidably coupled to the second mount piece.

14. A launch lock assembly according to claim 13 wherein the axial gap amplification device is positioned between the sliding clamp member and the inner annular projection.

15. A spacecraft isolation system for deployment between a spacecraft and a payload, the spacecraft isolation system comprising:
a plurality of isolators disposed between the spacecraft and the payload in a multi-point arrangement; and
at least one launch lock assembly coupled between the spacecraft and the payload in parallel with the plurality of isolators, the launch lock assembly comprising:
first and second mount pieces;
a releasable clamp device normally maintaining the first and second mount pieces in clamped engagement and, when actuated, releasing the first and second mount pieces from clamped engagement to allow relative axial motion therebetween; and
an axial gap amplification device normally residing in a blocking position wherein the gap amplification device obstructs relative axial motion between the first and second mount pieces, the axial gap amplification device moving into a non-blocking position when the first and second mount pieces are released from clamped engagement to increase the range of axial motion between the first and second mount pieces.

16. A launch lock assembly according to claim 1 wherein the first and second mount pieces remain attached through the axial gap amplification device after actuation of the releasable clamp device.

17. A launch lock assembly according to claim 1 wherein the axial gap amplification device comprises:
a first contrate ring coupled to the second mount piece; and
a second contrate ring rotatably coupled to the first contrate ring.

* * * * *